Sept. 15, 1964                     F. M. NASH                         3,149,070
                            BACKWASHING PRESSURE FILTER
Filed Nov. 17, 1960                                                 2 Sheets-Sheet 2
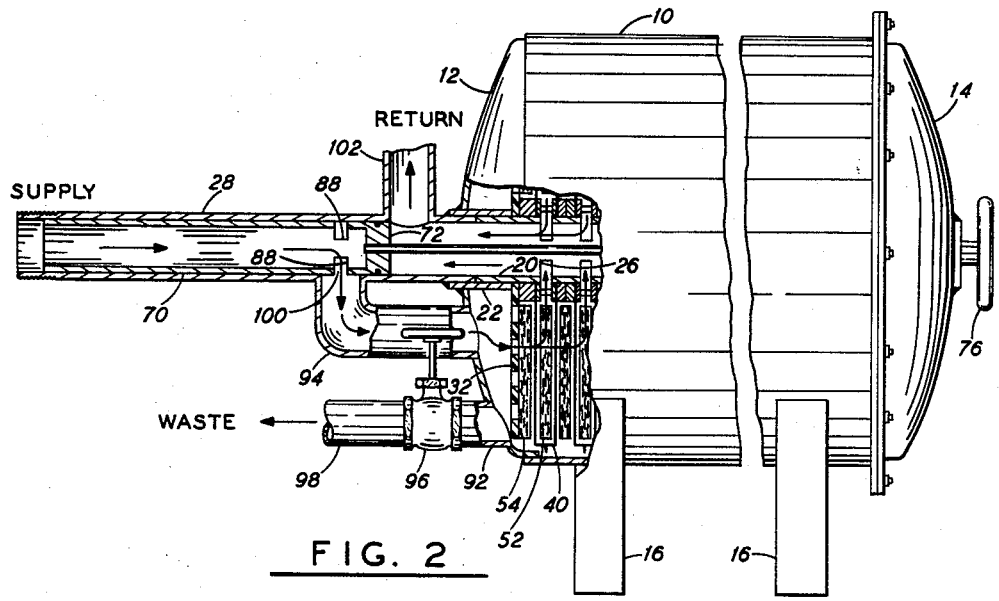
FIG. 2
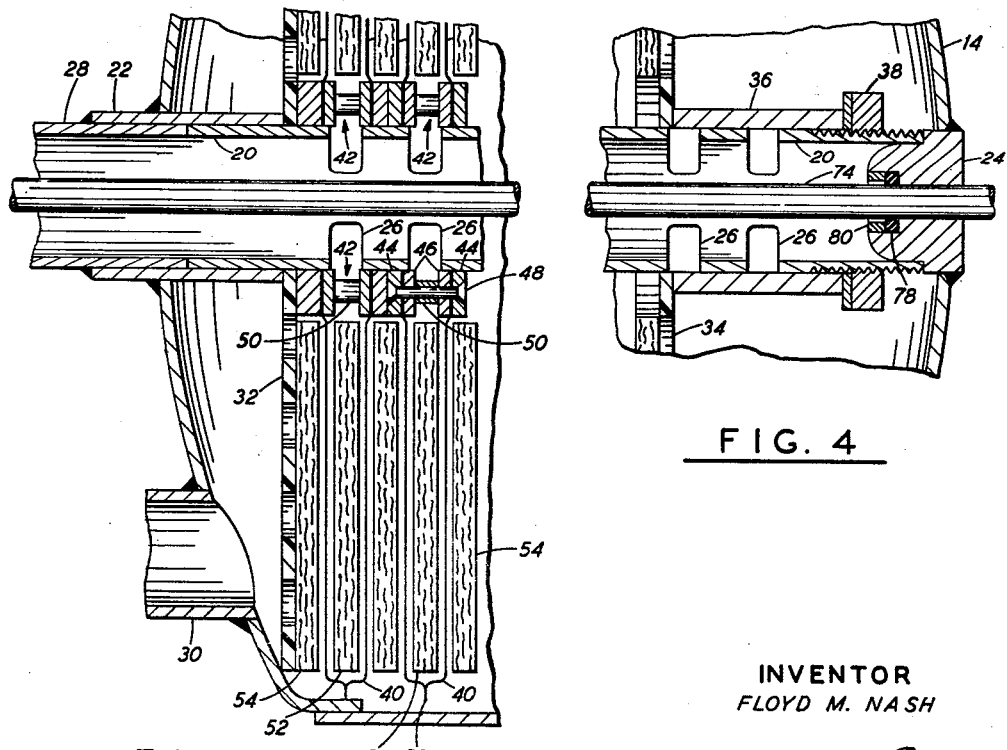
FIG. 3
FIG. 4
INVENTOR
FLOYD M. NASH
BY *Naylor & Neal*
ATTORNEYS

United States Patent Office 3,149,070
Patented Sept. 15, 1964

3,149,070
BACKWASHING PRESSURE FILTER
Floyd M. Nash, Berkeley, Calif., assignor to Jacuzzi Bros., Inc., Richmond, Calif., a corporation of California
Filed Nov. 17, 1960, Ser. No. 69,847
3 Claims. (Cl. 210—169)

This invention relates to an improved apparatus for filtering fluids and more particularly to an improved backwashable pressure filter of filtering fluids by the manipulation of the filter. The apparatus of this invention is particularly useful in filtering the water in swimming pools. This application is a continuation-in-part of my copending application Serial Number 724,475, filed March 27, 1958, now Patent No. 2,980,256, issued April 18, 1961.

In the art of filtering fluids, and specifically in the swimming pool filter art, it is desirable to provide filters which can be cleaned by backwashing since the simplicity of a backwashing operation reduces substantially the problems of maintaining the filtering system. Thus cleaning of a filtering system by backwashing may be accomplished by the manipulation of valves without the necessity of removing the filtering element from the container in which it is housed.

In the types of backwashable filters used at the present time, several operational problems have been encountered which have prompted the development of a number of filter systems, particularly in the swimming pool filtering art, which do not employ backwashing. The advantages of backwashing which have been lost in these systems have been replaced, in part, by the provision of relatively small filtering elements which can be removed and cleaned easily. However, the use of these non-backwashable filters generally results in less efficient filtering action and/or the necessity for more frequent cleaning than with backwashable filters.

Accordingly, it is a principal object of this invention to provide an apparatus for filtering fluids in which the filtering medium employed may be backwashed more efficiently than possible heretofore.

It is another object of the invention to provide an apparatus for filtering fluids in which backwashing of the filter medium may be accomplished more rapidly and with less backwashing fluid than heretofore possible.

It is another object of the invention to provide such apparatus for filtering fluids in which only infrequent backwashing of the filter medium is necessary.

It is another object of the invention to provide such apparatus for filtering fluids in which the filter medium can be backwashed without moving it from the position in which it is disposed during filtering.

It is another object of the invention to provide such an apparatus for filtering fluids in which the filtering and backwashing operations are conducted by forcing the fluid stream of the same pump through the filter medium in opposite directions.

It is a more specific object of the invention to provide an apparatus for filtering fluids in which a fluid may be filtered by pumping a stream thereof through a filter medium and in which the filter medium may be backwashed by passing the fluid stream through the filter medium in reverse direction while the flow path of the stream is concentrated into a small portion of the filter medium.

It is another specific object of the invention to provide such a filtering apparatus with means for concentrating the backwashing flow path into a series of small portions of the filter medium sequentially until the entire medium has been backwashed.

It is another object of the invention to provide filtering apparatus which is particularly well suited for filtering fine slime and silt from the water of swimming pools and the like.

It is another object of the invention to provide such apparatus with which water can be filtered very rapidly by passing the water stream output of a pressure pump therethrough.

It is another object of the invention to provide such filtering apparatus which has a long useful life and is not subject to damage by the flow of water under pressure through the filtering septum.

Other objects and advantages of the invention will become apparent from the following description read in conjunction with the attached drawings in which:

FIG. 2 is a view similar to FIG. 1 illustrating an alternative form of apparatus of the invention;

FIG. 3 is a view in vertical section, on an enlarged scale, of a fragment of the apparatus of FIG. 1, and FIG. 4 is a view in vertical section, on an enlarged scale, of the righthand portion of the apparatus of FIGS. 1 and 2.

Figure 1:
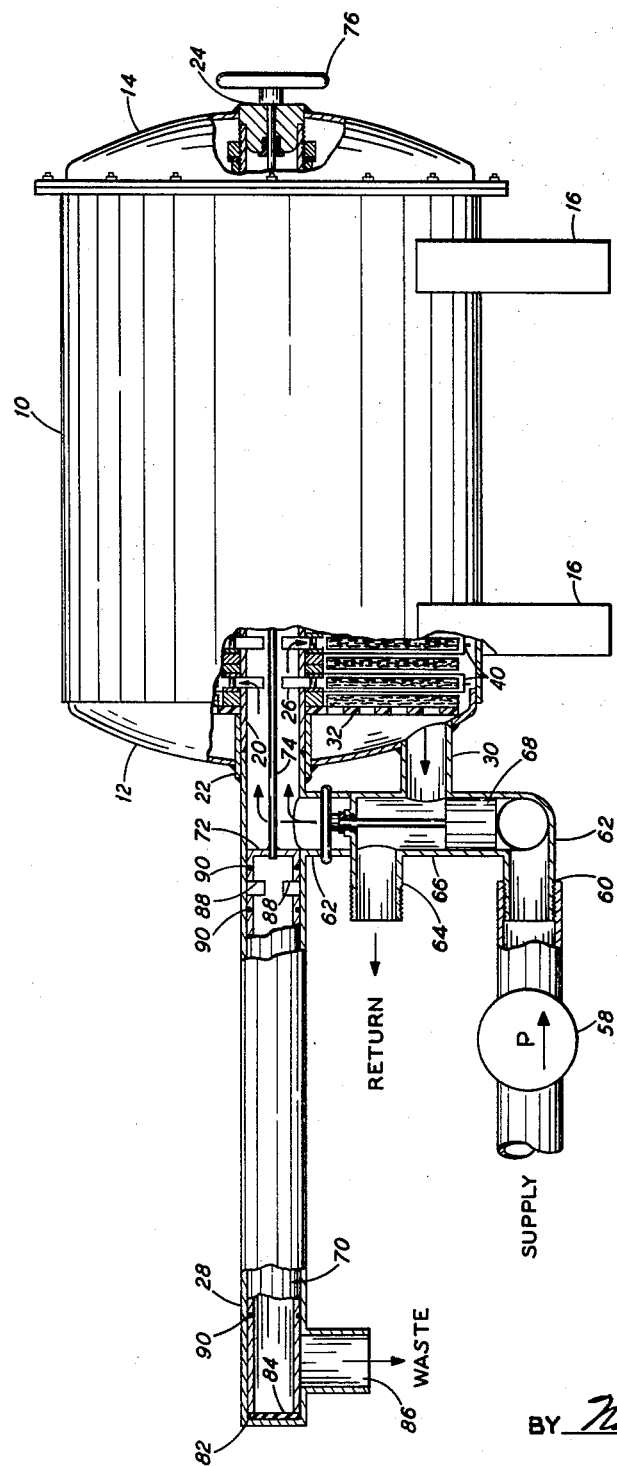
FIG. 1 is a view in side elevation, partially in section of filtering apparatus constructed in accordance with the invention and adapted for manipulation in accordance with the method of this invention.

Referring now in detail to the drawings and particularly to FIG. 1, the filtering apparatus illustrated therein comprises a tank 10 which is generally cylindrical in shape and provided with end heads 12 and 14. The tank 10 is supported on suitable pedestals 16.

An elongated tube 20 is mounted in tank 10 axially thereof by means of a sleeve 22 welded to the head 12 of the tank and a plug 24 welded to the head 14 of the tank. The tubular member 20 is provided with a plurality of laterally extending ports 26 therein spaced along the length of the tubular member 20. A fluid conduit 28 is connected to the tank 10 mounted in the sleeve 22 and welded thereto in axial alignment with the tubular member 20, and a conduit 30 extends through the head 12 of the tank and is welded thereto.

A pair of perforated discs 32 and 34 (see FIG. 3) are mounted in the tank on the tubular member 20, the perforate member 34 being held in place by a sleeve 36 and a nut 38 which is threaded upon the outer surface of the tubular member 20 (see FIG. 4). A plurality of bags 40 are mounted in the tank 10, each bag 40 having the shape of a disc with a central aperture therethrough and an inwardly facing mouth indicated generally at 42 in FIG. 3. As illustrated in FIG. 3, each of the bags 40 is supported by a pair of outer perforated rings 44 and a pair of inner perforated rings 46, with one ring of each pair embracing an edge of the inwardly facing mouth of the bag 40. The perforate rings 44 and 46 are connected by pins 48 and are held apart by short cylindrical spacers 50. The dimensions of the rings 44 and 46 and the spacers 50 are chosen so that the inwardly facing mouths of each of the bags 40 will be in alignment with the laterally facing ports 26 in the tubular member 20. The interior of each of the bags 40 is thus in communication with the interior of the tubular member 20 through the open passageways between adjacent spacers 50.

The bags 40 are constructed of a very fine mesh fabric or other material which will support the filter media, diatomaceous earth. Each of the bags is internally supported by an annular disc 52, and the bags are externally supported by annular discs 54 which are mounted in the tank 10 sandwiched between the bags 40. The annular discs 52 and 54 are constructed of a fairly open porous material which is generally rigid such as fiber glass mats. The discs 52 and 54 support the walls of the bags 40 and prevent the bags 40 from being ruptured at high filtering pressure. The bags 40 may be constructed in any suitable manner and are illustrated in the drawing as being constructed of two annular strips of material stitched together along their outer periphery as at 56.

A fluid pressure pump 58 (see FIG. 1) is connected to the interior of the tubular member 20 by a conduit 60 and a conduit 62. When the filtering system illustrated in FIG. 1 is employed for filtering the water in a swimming pool, the intake port on the pressure pump 58 is connected to the water drain in the bottom of the swimming pool. Accordingly, water is pumped by the pump 58 through the conduit 60 and 62 to the interior of the tubular member 20, thence through the ports 26 and between the spacers 50 into the mouths 42 of the bags 40. Small particles suspended in the water are absorbed by the filter media on the walls of the bags 40 as water passes outwardly through those walls. The water thus filtered passes through the annular members 54 to the periphery of the tank 10 and thence to the conduit 30 in the head 12 of the tank. A fluid exhaust conduit 64 is connected to the conduit 30 through the cylinder 66 of a distributing valve 68. When the apparatus of FIG. 1 is being employed to filter the water in a swimming pool the exhaust conduit 64 is conveniently connected to the water inlet pipe of the swimming pool.

As illustrated in FIG. 1, an elongated slide valve member 70 is telescopically mounted in the conduit 28. The end 72 of slide valve member 70 which is adjacent to the tank 10 is welded to a manipulating rod 74 which extends through the tubular member 20 and through the plug 24 to a manipulating handle 76 on the outside of the tank 10. An O-ring 78 is mounted in the plug 24 by means of a sleeve 80 to provide a watertight fit between the plug 24 and the manipulating rod 74. The end 82 of the slide valve 70 remote from the tank 10 is open and abuts against a sealing washer 84 when the slide valve 70 is in the position illustrated in FIG. 1. The conduit 28 is connected to a waste conduit 86 adjacent the end of the conduit 28 remote from the tank 10. A pair of laterally extending ports 88 are provided in the slide valve 70 adjacent its end 72, and a plurality of O-rings 90 are mounted on the exterior surface of the slide valve 70 positioned to provide fluid seals between the slide valve 70 and the conduit 28.

When filtering has been conducted in the described manner for a sufficient period of time that the filter media has become clogged with particles filtered from the water, the apparatus is backwashed in accordance with a method of this invention by manipulating the distributing valve 68 to seal off the exhaust conduit 64 and to connect the conduit 30 to the pump 58 through the conduit 60. At the same time, the manipulating handle 76, and the manipulating rod 74, are pulled out of the tank to the right as illustrated in FIG. 1 thereby moving the slide valve 70 to the right as illustrated in FIG. 1; this movement is continued until the lateral apertures 88 are in communication with the lateral port 26 in the tubular member 20 closest to the head 12 of the tank. At this point the wall of the slide valve 70 has sealed off the conduit 62 thereby preventing the passage of fluid directly from the pump 58 to the tubular member 20 through the conduit 62 and forcing the fluid to flow from the pump 58 through the conduits 60 and 30 into the areas in the tank 10 outside of the tubular member 20. The fluid then flows in reverse direction through the apertured member 32, the exterior bag support members 54, the walls of the bags 40, and the interior bag support members 52 to wash the dirt accumulated into the tubular member 20 through the ports 88 in the slide valve 70 and hence to the waste conduit 86. During this backwashing of the filter medium the end 72 of the slide valve 70 and the side walls of the slide valve 70 prevent fluid from flowing into the interior of the slide valve 70 except through the lateral ports 88, and since the ports 88 are in alignment with only one set of ports 26 in the tubular member 20, the backwashing stream supplied from the pump 58 is concentrated into a small flow path leading through the mouth of only one of the bags 40. This concentration of the flow path during backwashing greatly increases the effectiveness of the backwashing stream in removing dirt from the walls of the bags 40 and the porous bag supporting members 52. The slide valve 70 is moved down the length of the tubular member 20 to connect the ports 88 in the slide valve 70 sequentially with the inwardly facing mouths of each of the bags 40 to sequentially backwash each of the bags 40 separately. This sequential backwashing of the bags 40 may be accomplished by continuously moving the slide valve 70 through the length of the tubular member 20, or the slide valve 70 may be moved continually and stopped in communication with each of the ports 26 in the tubular member 20; this continual movement of the slide valve 70 may be facilitated by the provision of annular grooves in the outer wall of the slide valve 70 and a spring-loaded ball cooperating therewith or any other suitable means to indicate the alignment of the ports 88 with each of the sets of ports 26.

After the slide valve 70 has been moved the length of the tubular member 20 to sequentially backwash each of the bags 40, the slide valve 70 may be returned to the position illustrated in FIG. 1 and the distributing valve 68 returned to the position of FIG. 1 to again employ the apparatus for filtering the output stream of the pump 58.

Backwashing of the filter media conducted in this manner results in more rapid and thorough cleaning of the filter media with less backwashing fluid than is possible by backwashing the entire filter media at the same time.

The apparatus described above which is illustrated in FIG. 1 employs the filtering apparatus in tank 10 to filter liquid while water is moving radially outwardly of the tank and to backwash the filter media while liquid is moving radially inwardly of the tank. The apparatus of FIG. 2 is identical to the apparatus of FIG. 1 except that the fluid conduits are connected to the tank 10 in a manner to reverse this procedure and to filter liquid while fluid is flowing radially inwardly of the tank and to backwash the bags 40 while fluid is flowing radially outwardly in the tank.

In the apparatus of FIG. 2, the conduit 30 in the head 12 of the pump has been replaced by two conduits 92 and 94, the conduit 92 being provided with a valve 96 and being connected to a waste conduit 98 through which fluid is exhausted while the filter media is being backwashed. The conduit 94 is connected to the conduit 28 at a junction 100 outside of the tank 10 and the ports 88 in the slide valve 70 communicate with the junction 100 when the slide valve 70 is in the position illustrated in FIG. 2 for filtering fluid in the tank. A fluid exhaust conduit 102 is connected to the conduit 28 between the junction 100 and the head 12 of the tank 10, with the end 72 of the slide valve 70 being normally positioned between the exhaust conduit 102 and the junction 100. When the apparatus illustrated in FIG. 2 is employed to filter the water in a swimming pool, the exhaust conduit 102 is connected to the water supply pipe of a swimming pool, and the end of the conduit 28 remote from the tank 10 is connected to the output side of the water pump which pumps water out of the water drain from the swimming pool.

When the apparatus of FIG. 2 is employed to filter a fluid the fluid is passed into the lefthand end of the conduit 28, axially through the slide valve 70 hence through the ports 88 and the junction 100 and through the conduit 94 into the tank 10; the fluid then flows through the ports of member 32, the external bag support members 54, the walls of the bags 40, the internal bag support members 52 and through the mouths of the bags 40 into the tubular member 20. The fluid is exhausted from the tubular member 20 through the exhaust conduit 102.

When it is desirable to backwash the filter media in the apparatus of FIG. 2, the valve 96 is opened and the manipulating handle 76 is pulled to the right as illustrated in FIG. 1 until the ports 88 in the slide valve 70 are in alignment with one set of lateral ports 26 in the tubular member 20. Fluid then flows from the conduit 28 through slide valve 70 and the ports 88 through ports 26 in the tubular member 20, radially outwardly through an internal bag support member 52 and the walls of a bag 40, thence through the external bag support members 54, the port of member 32 and the fluid exhaust conduits 92 and 98. The slide valve 70 is moved sequentially along the length of the tubular member 20 to backwash all of the bags 40 sequentially until all of the bags 40 have been backwashed, when the slide valve 70 is again returned to the position illustrated in FIG. 2 and the valve 96 closed to start another filtering operation over again.

While two specific embodiments of the apparatus of the invention have been illustrated above, it is obvious that many modifications and the details thereof may be made without departing from the spirit and scope of the invention and that many other forms of apparatus may be employed for practicing the method of this invention.

What is claimed is:

1. Apparatus for filtering fluid comprising a tank, a plurality of filter elements and passageway-defining means positioning the same within said tank for the passage therethrough radially of the tank of fluid to be filtered, inlet conduit means connected to the tank and to said passageway-defining means for the delivery thereto of dirt-laden fluid from its normal location of use, outlet conduit means connected to said tank and to said passageway-defining means for the delivery therefrom of clean fluid to said normal location of use, said inlet and outlet conduit means having interconnecting portions, waste conduit means connected to said tank for the delivery therefrom of dirt-laden backwash fluid, first valve means normally positioned to totally prevent fluid flow from said tank through said waste conduit means, second valve means normally positioned to constrain fluid flowing into said tank to pass in its entirety through said inlet conduit means and to constrain fluid flowing out of said tank to pass in its entirety through said outlet conduit means, one of said valve means being shiftable within the interconnecting portions of said inlet and outlet conduit means to a second position to totally cut off effluent flow through said outlet conduit means without interrupting the flow of influent fluid to said tank, the other of said valve means being shiftable to a second position for concurrent operation with said one valve means in its second position to thereby limit effluent fluid flow from said tank to said waste conduit means, and backwashing means including means shiftably positionable within said tank to interconnect said inlet conduit means to said waste conduit means, when said valve means are each in their second positions, through less than all of said filter elements, the direction of flow therethrough being then reversed with respect to the flow direction therethrough when said valve means are each in their normal positions of operation.

2. Apparatus for filtering fluid comprising a tank, a conduit extending longitudinally of said tank, longitudinally spaced ports in said conduit, a plurality of filter elements mounted concentrically of said conduit, each of said elements being in communication with one of said ports, a ported slide valve disposed in said conduit normally positioned outside of said tank, a supply line for dirt-laden fluid having a connection with said conduit between said filter elements and the normal position of said slide valve, a return line for filtered water connected to said tank, said supply line and said return line having intermediate portions in common, a valve associated with said portions in common operable in one position to constrain total influent flow to said tank to said supply line and said conduit and to constrain total effluent flow from said tank to said return line and operable in another position to interconnect said supply and return lines and prevent effluent flow through the latter, a waste line connected to said conduit closed to effluent flow by said slide valve in its normal position, in which position said slide valve is disposed between the waste line and the place of connection between said supply line and said conduit, and open to total effluent flow from said tank when said slide valve is moved inwardly of said tank to interrupt the connection between said supply line and conduit and to bring the ports of said slide valve into selective communication with the ports of said conduit, and means to so move said slide valve away from and to its normal position.

3. Apparatus for filtering fluid comprising a tank, a conduit extending longitudinally of said tank, longitudinally spaced ports in said conduit, a plurality of filter elements mounted concentrically of said conduit, each of said elements being in communication with one of said ports, a slide valve disposed in said conduit normally positioned outside of said tank, said slide valve having an inner end wall and peripheral porting, a supply line for dirt-laden fluid having a portion in common with said conduit at the outside of said tank and having a branch connecting between said conduit and said tank, influent flow to said tank being restricted in its entirety by the inner end wall of said slide valve to said branch connection and taking place through said peripheral porting of said slide valve when said slide valve is in its normal position, a return line for total effluent flow from said tank connected to said conduit between said filter elements and said slide valve when the latter is in its normal position, a waste line connected to said tank, valve means for opening and closing said waste line, and means for shifting said slide valve within said conduit inwardly of said tank to close off communication between said conduit and branch connection of said supply line through said peripheral porting and between said conduit and said return line to deliver total influent supply fluid selectively through the peripheral porting of said slide valve and the ports of said conduit and thereby limit total effluent flow from said tank to said waste line when the valve means therefor is open.

References Cited in the file of this patent
UNITED STATES PATENTS

| | | |
|---|---|---|
| 402,738 | Hyatt | May 7, 1889 |
| 1,137,075 | Morris | Apr. 27, 1915 |
| 2,173,060 | Andrews | Sept. 12, 1939 |
| 2,858,850 | Arenson | Nov. 4, 1958 |
| 2,981,416 | Lawlor | Apr. 25, 1961 |

FOREIGN PATENTS

| | | |
|---|---|---|
| 911,085 | France | Feb. 25, 1946 |